(12) United States Patent
Teshima et al.

(10) Patent No.: US 11,898,579 B2
(45) Date of Patent: Feb. 13, 2024

(54) EJECTOR AND FUEL CELL SYSTEM INCLUDING THE SAME

(71) Applicants: AISAN KOGYO KABUSHIKI KAISHA, Obu (JP); TOYOTA JIDOSHA KABUSHIKI KAISHA, Toyota (JP)

(72) Inventors: Nobutaka Teshima, Toyota (JP); Masaaki Matsusue, Mishima (JP)

(73) Assignees: AISAN KOGYO KABUSHIKI KAISHA, Obu (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 480 days.

(21) Appl. No.: 17/276,703

(22) PCT Filed: Sep. 20, 2019

(86) PCT No.: PCT/JP2019/036979
§ 371 (c)(1),
(2) Date: Mar. 16, 2021

(87) PCT Pub. No.: WO2020/071157
PCT Pub. Date: Apr. 9, 2020

(65) Prior Publication Data
US 2022/0025908 A1   Jan. 27, 2022

(30) Foreign Application Priority Data

Oct. 3, 2018   (JP) .................................. 2018-187940

(51) Int. Cl.
*F04F 5/46* (2006.01)
*F04F 5/20* (2006.01)
(Continued)

(52) U.S. Cl.
CPC .................. *F04F 5/46* (2013.01); *F04F 5/20* (2013.01); *H01M 8/04097* (2013.01);
(Continued)

(58) Field of Classification Search
None
See application file for complete search history.

(56) References Cited

U.S. PATENT DOCUMENTS

2002/0022172 A1* 2/2002 Sahoda ..................... F04F 5/54
429/512
2018/0111134 A1   4/2018 Singh

FOREIGN PATENT DOCUMENTS

JP   2002-56869 A    2/2002
JP   2009-129814 A   6/2009
(Continued)

*Primary Examiner* — Wyatt P Mcconnell
(74) *Attorney, Agent, or Firm* — Oliff PLC

(57) ABSTRACT

An ejector having a nozzle for jetting a hydrogen gas (working fluid), wherein the nozzle includes an inner nozzle and an outer nozzle, both the nozzles are disposed to encompass an axis of a diffuser, an axis of the inner nozzle or an axis of the outer nozzle is arranged to align with the axis, an inner jet hole through which the hydrogen gas flows is formed in the inner nozzle, an outer jet hole having a ring-shaped cross section through which the hydrogen gas flows is provided between the inner nozzle and the outer nozzle, the outer jet hole when a main body casing is horizontally disposed includes an upper hole portion above the axis and a lower hole portion under the axis, and the inner nozzle and the outer nozzle are mutually eccentrically disposed so that the lower hole portion is narrower than the upper hole portion.

9 Claims, 14 Drawing Sheets

(51) Int. Cl.
　　　*H01M 8/04089*　　(2016.01)
　　　*H01M 8/04119*　　(2016.01)
　　　*H01M 8/04082*　　(2016.01)
(52) U.S. Cl.
　　　CPC ... *H01M 8/04164* (2013.01); *H01M 8/04201* (2013.01); *H01M 2250/20* (2013.01)

(56) References Cited

FOREIGN PATENT DOCUMENTS

| | | |
|---|---|---|
| JP | 2010-159834 A | 7/2010 |
| JP | 2010-186730 A | 8/2010 |
| JP | 2011-179333 A | 9/2011 |
| JP | 2013-160407 A | 8/2013 |
| JP | 2018-60757 A | 4/2018 |
| WO | 2016/161498 A1 | 10/2016 |

* cited by examiner

EJECTOR AND FUEL CELL SYSTEM INCLUDING THE SAME

CROSS-REFERENCE TO RELATED APPLICATIONS

This application is a US national phase application of International Application No. PCT/JP2019/036979, filed on Sep. 20, 2019, and claiming the priority of Japanese Application No. 2018-187940, filed Oct. 3, 2018, whose entire disclosures are incorporated herewith by reference.

TECHNICAL FIELD

The technique disclosed in this specification relates to an ejector configured to generate a negative pressure by flowing a working fluid to further make a target fluid flow by the operation of the negative pressure and a fuel cell system including the same.

BACKGROUND ART

Heretofore, as this type of technique, there has been known a fuel cell system and an ejector used therefor as described in the Patent Document 1 below, for example. The ejector includes a nozzle portion to receive supply of hydrogen gas as a working fluid and a mixture passage portion placed on a downstream side of the nozzle portion with respect to the flow of the hydrogen gas. The ejector is configured to suck hydrogen off-gas as the target fluid by the negative pressure generated by the hydrogen gas that is injected from the nozzle portion and to send gas mixture of the injected hydrogen gas and the sucked hydrogen off-gas through the mixture passage portion. This ejector includes the nozzle portion provided with two injection holes to inject the hydrogen gas, and these injection holes open to a throat portion (a diffuser) of the mixture passage portion. Further, axes of these two injection holes are arranged to deviate from an axis of the diffuser, and the respective opening diameters of the injection holes are made equal.

RELATED ART DOCUMENTS

Patent Documents

Patent Document 1: JP2018-060757A

SUMMARY OF INVENTION

Problems to be Solved by the Invention

Incidentally, in the ejector described in the Patent Document 1, the two injection holes are arranged to deviate from the axis of the diffuser, respectively, so that the hydrogen gas in the diffuser fails to flow in an ideal manner, resulting in loss of the flow, which may cause decline in a suction efficiency of the hydrogen off-gas. Further, in this ejector, when the cool hydrogen gas injected through the injection holes and the sucked warm hydrogen off-gas are to be merged, there is a possibility that moisture included in the hydrogen off-gas is condensed and then enters in the injection holes and that the thus condensed moisture may stay inside the injection holes. In this case, dew condensation water may disturb the injection of the hydrogen gas from the injection holes. Furthermore, under a low-temperature environment, there is a possibility that the dew condensation water gets frozen inside the injection holes, thereby inhibiting injection of the hydrogen gas from the injection holes.

The present disclosure has been made in view of the above circumstances and has a purpose of providing an ejector and a fuel cell system including the same that can achieve uniform and preferable mixture of a working fluid to be injected from a plurality of nozzles to a negative pressure generation chamber and a target fluid sucked into the negative pressure generation chamber and that can achieve prevention of disturbance in injection of the working fluid by effectively discharging dew condensation water from injection holes of the nozzle.

Means of Solving the Problems (1) To achieve the above purpose, one aspect of the present disclosure provides an ejector comprising a tubular main body casing, the main body casing including: a plurality of first supply ports configured to receive supply of a working fluid; a second supply port configured to receive supply of a target fluid; a negative pressure generation chamber configured to generate a negative pressure by the working fluid; a plurality of nozzles respectively provided corresponding to a plurality of the first supply ports and each having a leading end placed in the negative pressure generation chamber to inject the working fluid; a diffuser in which the working fluid and the target fluid flow, which is communicated with the negative pressure generation chamber; and a discharge port to discharge the working fluid and the target fluid that have flown in the diffuser to outside, the ejector being configured such that the negative pressure is generated in the negative pressure generation chamber by the working fluid that is supplied to the respective first supply ports and injected from the respective corresponding nozzles, the target fluid is sucked in the negative pressure generation chamber from the second supply port by the negative pressure, and the target fluid is made to flow with the working fluid to the diffuser to be discharged out of the discharge port, wherein a plurality of the nozzles include an inner nozzle and at least one outer nozzle provided to enclose the inner nozzle, the inner nozzle and the outer nozzle being arranged to enclose a diffuser axis as an axis of the diffuser so that any one of an axis of the inner nozzle and an axis of the outer nozzle is arranged to be aligned with the diffuser axis, the inner nozzle is provided with an inner injection hole in which the working fluid flows, an outer injection hole having an annular section in which the working fluid flows is provided between the inner nozzle and the outer nozzle, when the main body casing is horizontally placed so that the diffuser axis extends horizontally, and the outer injection hole including an upper hole portion on an upper side of the diffuser axis and a lower hole portion on a lower side of the diffuser axis is placed such that the inner nozzle and the outer nozzle are eccentrically placed from each other to make the lower hole portion narrower than the upper hole portion.

According to the above configuration (1), the working fluid supplied to the respective first supply ports flows through the inner nozzle and the outer nozzle and then is injected to the negative pressure generation chamber through the inner injection hole and the outer injection hole and further flows in the diffuser to be discharged out of the discharge port. This flow of the working fluid generates the negative pressure in the negative pressure generation chamber and the target fluid supplied to the second supply port is sucked in a decompression chamber by the negative pressure, so that the target fluid flows in the diffuser with the working fluid to be mixed therewith and discharged out of the discharge port. Herein, the inner nozzle and the outer nozzle are arranged to enclose the diffuser axis so that any one of the axis of the inner nozzle and the axis of the outer nozzle is arranged to be aligned with the diffuser axis. Therefore, the working fluid injected from the inner nozzle or the outer nozzle flows in the diffuser to be aligned with (along) the diffuser axis, and the target fluid sucked in the negative pressure generation chamber flows in the diffuser to enclose the working fluid. Further, the inner nozzle is provided with the inner injection hole through which the working fluid flows, and the outer injection hole having an annular section through which the working fluid flows is provided between the inner nozzle and the outer nozzle. The outer injection hole includes the upper hole portion and the lower hole portion, and the inner nozzle and the outer nozzle are eccentrically placed from each other to make the lower hole portion narrower than the upper hole portion. Accordingly, in the outer injection hole, the flow of the working fluid becomes relatively fast in the narrow lower hole portion, and thus the dew condensation water generated in the outer injection hole gather in the lower hole portion due to the gravity, so that the dew concentration water is easily brown off at high speed with the working fluid to the decompression chamber.

(2) To achieve the above object, in the above configuration (1), preferably, the respective first supply ports are placed on an upper side of the main body casing when the main body casing is horizontally placed.

According to the above configuration (2), in addition to the operation of the above configuration (1), the working fluid supplied to the respective first supply ports flows vertically downward from the upper side of the main body casing to the inner nozzle and the outer nozzle. Accordingly, the working fluid especially flowing to the outer injection hole of the outer nozzle easily flows much to the lower hole portion, and the dew condensation water having gathered at the lower hole portion is easily blown off at high speed with the working fluid to the decompression chamber.

In order to achieve the above purpose, in the above configuration (1) or (2), preferably, the main body casing is provided between the negative pressure generation chamber and the discharge port with a fluid passage in which the working fluid and the target fluid flow, the main body casing including the diffuser, and a warm fluid passage to flow a predetermined warm fluid therein is provided in a surrounding of the fluid passage.

According to the above configuration (3), in addition to the operation of the above configuration (1) or (2), the fluid passage is warmed up by the flow of the warm fluid in the warm fluid passage, thus preventing a temperature on an inner wall of the fluid passage from decreasing to a dew point.

(4) In order to achieve the above purpose, in the above configuration (3), preferably, the warm fluid passage has an annular section in a direction orthogonal to its longitudinal direction, the main body casing is provided with a warm fluid inlet on one end in the longitudinal direction of the warm fluid passage to introduce the warm fluid in the warm fluid passage and a warm fluid outlet on the other end in the longitudinal direction of the warm fluid passage to bring the warm fluid out of the warm fluid passage, the main body casing being configured such that the warm fluid introduced from the warm fluid inlet flows spirally in the warm fluid passage to be brought out of the warm fluid outlet, and the warm fluid inlet and the warm fluid outlet are placed to face in tangential directions of the annular section of the warm fluid passage so that at least any one of the warm fluid inlet and the warm fluid outlet opens upward.

According to the above configuration (4), in addition to the operation of the above configuration (3), the warm fluid passage has the annular section, and the main body casing is provided on one end in the longitudinal direction of the warm fluid passage with the warm fluid inlet to introduce the warm fluid and with the warm fluid outlet on the other end in the longitudinal direction to bring out the warm fluid. Further, the warm fluid having been introduced from the warm fluid inlet flows spirally in the warm fluid passage to be brought out of the warm fluid outlet. Thus, the entire fluid passage extending along the diffuser axis is uniformly warmed up by the warm fluid spirally flowing around the fluid passage. The warm fluid inlet and the warm fluid outlet are placed to face the tangential direction of the annular section of the warm fluid passage, respectively, and accordingly, the warm fluid is easily introduced into the warm fluid passage from the warm fluid inlet and easily brought out of the warm fluid passage to the warm fluid outlet. Furthermore, at least any one of the warm fluid inlet and the warm fluid outlet opens upward, and thus the air having entered the warm fluid passage is easily brought outside from at least any one of the warm fluid inlet and the warm fluid outlet.

(5) In order to achieve the above object, in the above configuration (3), preferably, the main body casing is configured with an outer casing and an inner casing attached to an inside of the outer casing, the outer casing is provided with the respective first supply ports and the second supply port, and the inner casing is provided with the inner nozzle, the outer nozzle, the negative pressure generation chamber, the fluid passage, and the discharge port, a warm fluid passage to flow the predetermined warm fluid is provided around the fluid passage between the outer casing and the inner casing, a plurality of sealing members are provided adjacent to one another with a gap between the outer casing and the inner casing and between the second supply port and the warm fluid passage, and the outer casing is provided with an exhaust port in correspondence with the gap between a plurality of the sealing members to eject the fluid outside.

According to the above configuration (5), in addition to the operation of the above configuration (3), the inner casing is attached to the inside of the outer casing to configure the main body casing, and concurrently with this attachment, the warm fluid passage is provided around the fluid passage between the outer casing and the inner casing. Further, a plurality of the sealing members are provided adjacent to one another with a gap between the outer casing and the inner casing and further between the second supply port and the warm fluid passage. The outer casing is provided with the exhaust port in correspondence with each of the gaps between a plurality of the sealing members.

Therefore, in case the working fluid leaks out of the sealing member from the second supply port to the warm fluid passage or in case the warm fluid leaks out of the sealing member from the warm fluid passage to the second supply port, the working fluid or the warm fluid is discharged outside via the exhaust port.

(6) In order to achieve the above object, in the above configuration (1), preferably, the main body casing is provided on its one end portion in a longitudinal direction with the negative pressure generation chamber and with a cavity in which the inner nozzle and the outer nozzle are accommodated, the cavity has a space in which the inner nozzle and the outer nozzle are not accommodated, and the space is communicated with the first supply ports and embedded with a plug or a protrusion to reduce a volume of the space.

According to the above configuration (6), in addition to the operation of the above configuration (1), the space in which the respective nozzles are not accommodated is embedded with the plug or the protrusion to reduce the volume of the space. Therefore, the hydrogen gas introduced into the space from the first supply ports is prevented from decompression.

(7) In order to achieve the above object, another aspect of the present disclosure is to provide a fuel cell system provided with the ejector according to any one of the above configuration (1) to (6), comprising: a fuel cell to generate electricity by receiving supply of fuel gas and oxidant gas; a fuel supply passage to supply the fuel gas to the fuel cell; a fuel circulation passage to circulate fuel off-gas discharged from the fuel cell to the fuel supply passage; and the ejector provided in a connected portion of the fuel supply passage and the fuel circulation passage.

The above configuration (7) is particularly preferable since there is a high possibility that the dew condensation water attaches to the inside of the injection hole formed in the ejector due to the characteristics of the fuel cell system.

(8) In order to achieve the above object, in the above configuration (7), preferably, the fuel cell system includes a gas-liquid separator in the fuel circulation passage upstream of the ejector to separate gas and liquid, the ejector is placed on a vertically lower side of the fuel cell and on a vertically upper side of the gas-liquid separator, the ejector is arranged to be inclined such that a side on which the respective first supply ports and the second supply port are provided is placed on a vertically lower side than a side on which the discharge port of the ejector is provided, the second supply port is placed on the vertically lower side of the ejector, and the fuel circulation passage extending from the gas-liquid separator is connected to the second supply port from the vertically lower side of the ejector.

According to the above configuration (8), in addition to any one of the operation of the above configurations (1) to (5), in the fuel cell system, the ejector is placed in the vertically lower side of the fuel cell and in the vertically upper side of the gas-liquid separator. Further, the ejector is inclined so that the first end part including the respective first supply ports and the second supply port is located in the vertically lower side of the second end part including the discharge port. Furthermore, the second supply port is placed in the vertically lower side of the ejector and the fuel circulation passage extending from the gas-liquid separator is connected to the second supply port from the vertically lower side of the ejector. Accordingly, even if the dew condensation water generated in the fuel cell flows in the ejector via the fuel supply passage and if the dew condensation water is generated in the ejector, the thus generated dew condensation water flows into the second supply port from the decompression chamber owing to the inclination of the ejector, and further flows to the gas-liquid separator through the fuel circulation passage.

Effects of the Invention

According to the above configuration (1), the working fluid injected to the decompression chamber from the inner nozzle or the outer nozzle and the target fluid sucked into the decompression chamber can be uniformly and satisfactorily mixed. Especially, the dew condensation water can be effectively discharged out of the outer injection hole of the outer nozzle, and thus disturbance in injection of the working fluid caused by the dew condensation water can be prevented.

According to the above configuration (2), in addition to the effect of the above configuration (1), the dew condensation water can be more effectively discharged out of the outer injection hole of the outer nozzle, and thus the disturbance in the injection of the working fluid caused by the dew condensation water can be further surely prevented.

According to the above configuration (3), in addition to the effect of the above configuration (1) or (2), it is possible to prevent generation of the dew condensation water and freezing of the dew condensation water in the fluid passage.

According to the above configuration (4), in addition to the effect of the above configuration (3), the flow velocity of the warm water in the warm water passage can be increased, thereby increasing the effect of warming up the fluid passage by the warm water. Further, it is possible to restrain the air from staying in the warm water passage, and in that sense, the effect of warming up the fluid passage by the warm water can be assured.

According to the above configuration (5), in addition to the effect of the above configuration (3), the warm water passage can be relatively easily formed in the ejector, and thus it is possible to prevent the working fluid from getting mixed in the warm water flowing in the warm water passage and to prevent the warm water from getting mixed in the target fluid which is to be supplied to the second supply port.

According to the above configuration (6), in addition to the effect of the above configuration (1), the less-decompressed working fluid can be supplied to the inner nozzle and the flow rate of the working fluid in the inner injection hole of the inner nozzle can be increased, thereby further improving the discharge effect of discharging the dew condensation water in the inner injection hole.

According to the above configuration (7), the fuel cell system can achieve the similar effect with any one of the above configurations (1) to (6).

According to the above configuration (8), in addition to the effect of the above configuration (7), the dew condensation water generated in the fuel cell and the ejector can be discharged out to the gas-liquid separator, and thus the separation process can be performed by the gas-liquid separator.

MODE FOR CARRYING OUT THE INVENTION

First Embodiment

A first embodiment embodying an ejector and a fuel cell system provided with the same is explained in detail below with reference to the accompanying drawings.

(Overview of Fuel Cell System)

Figure 1:
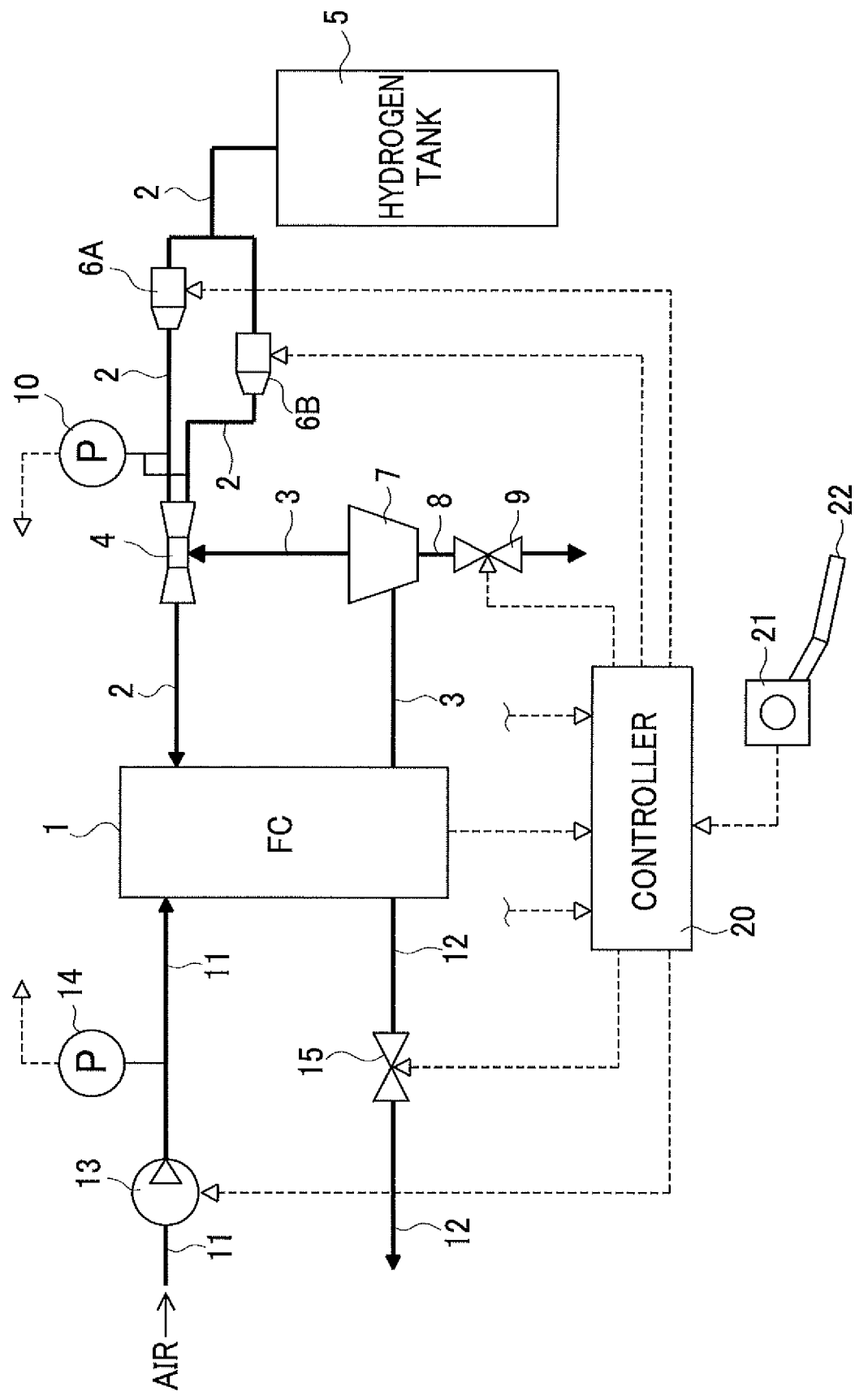
FIG. 1 is a schematic configurational view of a fuel cell system in a first embodiment.

FIG. 1 is a schematic configurational view of a fuel cell system according to the present embodiment. The fuel cell system is mounted on an electric automobile and used for supplying electric power to a drive motor (not shown) of the automobile. The fuel cell system includes a fuel cell (FC) 1. The fuel cell 1 is arranged to generate electricity by supply of hydrogen gas (as fuel gas) and the air (as oxidant gas). The electric power generated in the fuel cell 1 is supplied to the drive motor via an inverter (not shown). This drive motor is to be controlled based on a separately prepared command.

On an anode side of the fuel cell 1, there are provided a hydrogen supply passage 2 (as a fuel supply passage) to supply hydrogen gas to the fuel cell 1, a hydrogen circulation passage 3 (as a fuel circulation passage) to circulate hydrogen off-gas (as fuel off-gas) brought out of the fuel cell 1 to the hydrogen supply passage 2, and an ejector 4 provided in a connected portion of the hydrogen supply passage 2 and the hydrogen circulation passage 3. In the hydrogen supply passage 2, the hydrogen gas is made to flow from a hydrogen tank 5. The hydrogen supply passage 2 is provided on an upstream side of the ejector 4 with a first injector 6A and a second injector 6B, which are constituted by electromagnetic valves, to inject the hydrogen gas from the hydrogen tank 5. Inlet sides of the respective injectors 6A and 6B are connected in parallel with the hydrogen tank 5 via the hydrogen supply passage 2. Outlet sides of the injectors 6A and 6B are connected to two different nozzles 37 and 38 (see FIG. 2 and others) which are provided in the ejector 4 via the hydrogen supply passage 2, respectively. The hydrogen circulation passage 3 is provided with a gas-liquid separator 7 to separate gas and liquid. The gas-liquid separator 7 is arranged to separate moisture from the hydrogen off-gas (as a gaseous body), bring only the hydrogen off-gas to flow into the ejector 4, and discharge the moisture outside through a discharge passage 8. The discharge passage 8 is provided with an exhaust drain valve 9 constituted of an electromagnetic valve. In the hydrogen supply passage 2 among the ejector 4 and the respective injectors 6A and 6B, a hydrogen pressure sensor 10 is provided. The hydrogen pressure sensor 10 is configured to detect a hydrogen pressure on the outlet sides of the respective injectors 6A and 6B.

On the other hand, on a cathode side of the fuel cell 1, there are provided an air supply passage 11 (as an oxidant gas supply passage) to supply the air to the fuel cell 1 and an air discharge passage 12 to discharge the air off-gas which is brought out of the fuel cell 1. The air supply passage 11 is provided with an air pump 13 to adjust an air supply amount with respect to the fuel cell 1. The air supply passage 11 on a downstream side of the air pump 13 is provided with an air pressure sensor 14. The air pressure sensor 14 is configured to detect pressure of the air that is to be supplied to the fuel cell 1. Further, the air discharge passage 12 is provided with a switching valve 15 constituted of an electromagnetic valve.

In the above configuration, the hydrogen gas in the hydrogen tank 5 flows in the hydrogen supply passage 2 and then is supplied to the fuel cell 1 through the respective injectors 6A and 6B and the ejector 4. The hydrogen gas supplied to the fuel cell 1 is used for generation of electricity in the cell 1, and after that, brought out of the cell 1 as the hydrogen off-gas to the hydrogen circulation passage 3. The thus brought-out hydrogen off-gas is separated from the moisture in the gas-liquid separator 7, and then circulated in the hydrogen supply passage 2 via the ejector 4. At this time, the negative pressure is generated by the hydrogen gas flowing in the ejector 4, and the hydrogen off-gas is sucked into the ejector 4 by the thus generated negative pressure and mixed with the hydrogen gas to be circulated into the hydrogen supply passage 2.

As shown in FIG. 1, this fuel cell system is further provided with a controller 20. The controller 20 is to control the respective injectors 6A and 6B to regulate a flow rate (an amount of hydrogen) and others of the hydrogen gas flowing in the ejector 4. The controller 20 is to control the exhaust drain valve 9 to adjust exhaust drain from the discharge passage 8 while the controller 20 is to control the air pump 13 to regulate an amount of the air supplied to the fuel cell 1. Further, the controller 20 is to control the switching valve 15 to adjust the discharged flow rate of the air off-gas from the air discharge passage 12. The controller 20 is input with detection signals from the hydrogen pressure sensor 10 and the air pressure sensor 14. Further, the controller 20 takes in each of a voltage value and a current value for generation of electricity in the fuel cell 1. The controller 20 is further input with an accelerator opening degree corresponding to an operation amount of an accelerator pedal 22 from an accelerator sensor 21 provided in a driver's seat as a command value related to driving operation of an electric automobile. The controller 20 is provided with a central processing unit (CPU) and a memory and is arranged to control the respective injectors 6A and 6B, the air pump 13, and others based on a predetermined control program stored in the memory in order to regulate the hydrogen amount and the air amount to be supplied to the fuel cell 1.

(Ejector)

Figure 2:
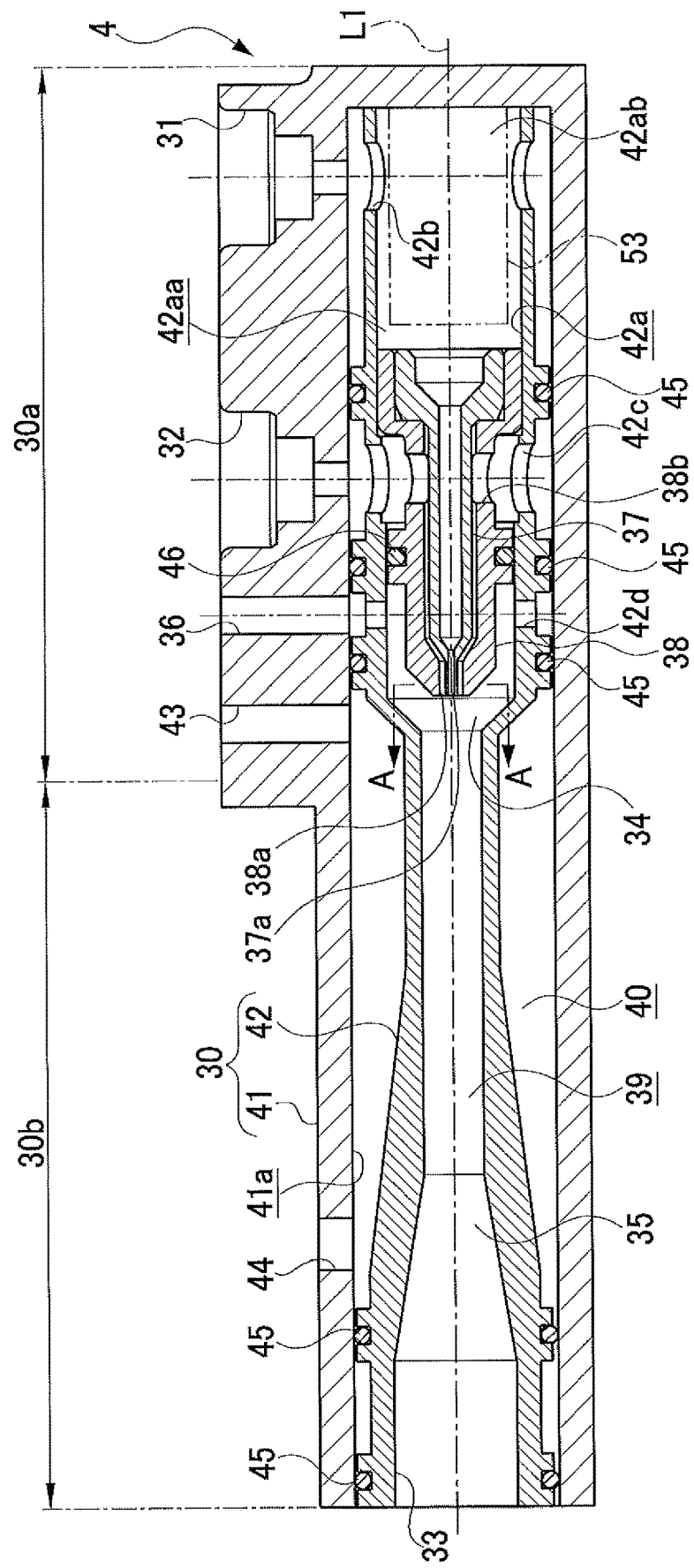
FIG. 2 is a front sectional view of an ejector in the first embodiment.

Next, a configuration of the ejector 4 is explained in detail. FIG. 2 is a front sectional view of the ejector 4. A state indicated in FIG. 2 is an official upper and lower arrangement of the ejector 4. However, as it will be explained below, the ejector 4 may be slightly inclined with respect to a horizontal state shown in FIG. 2 in the fuel cell system. As shown in FIG. 2, the ejector 4 is provided with a main body casing 30 of a tubular shape to make the working fluid and the target fluid flow. In the present embodiment, the hydrogen off-gas flowing in the hydrogen circulation passage 3 corresponds to the target fluid and the hydrogen gas flowing in the hydrogen supply passage 2 corresponds to the working fluid. The main body casing 30 includes a first end part 30a and a second end part 30b. In the present embodiment, the first end part 30a corresponds to a substantially right half part of the main body casing 30 and the second end part 30b corresponds to a substantially left part of the main body casing 30 in FIG. 2.

The first end part 30a includes two first supply ports 31 and 32 to receive supply of the hydrogen gas, a second supply port 36 to receive supply of the hydrogen off-gas, a negative pressure generation chamber 34 to generate negative pressure by the hydrogen gas, and two nozzles 37 and 38 for injecting the hydrogen gas provided corresponding to the two first supply ports 31 and 32, respectively, the nozzles 37 and 38 each having a leading end placed in the negative pressure generation chamber 34. These two nozzles 37 and 38 are provided almost coaxial to each other. Further, the second end part 30b includes a diffuser 35 communicated with the negative pressure generation chamber 34 and arranged to flow the hydrogen gas and the hydrogen off-gas therein and a single discharge port 33 to discharge the hydrogen gas and the hydrogen off-gas which have flown through the diffuser 35 outside. In the present embodiment, one first supply port 31 is connected to the first injector 6A via the hydrogen supply passage 2 and the second supply port 36 is connected to the second injector 6B via the hydrogen supply passage 2.

By the above basic configuration, the ejector 4 generates the negative pressure in the negative pressure generation chamber 34 by the hydrogen gas which is supplied to the first supply ports 31 and 32 and injected from the two nozzles 37 and 38 and sucks the hydrogen off-gas from the second supply port 36 to the negative pressure generation chamber 34 by the thus generated negative pressure. Then, the ejector 4 is arranged to flow the hydrogen off-gas with the hydrogen gas to the diffuser 35 to further discharge the hydrogen off-gas and the hydrogen gas to the fuel cell 1 from the discharge port 33.

Figure 3:
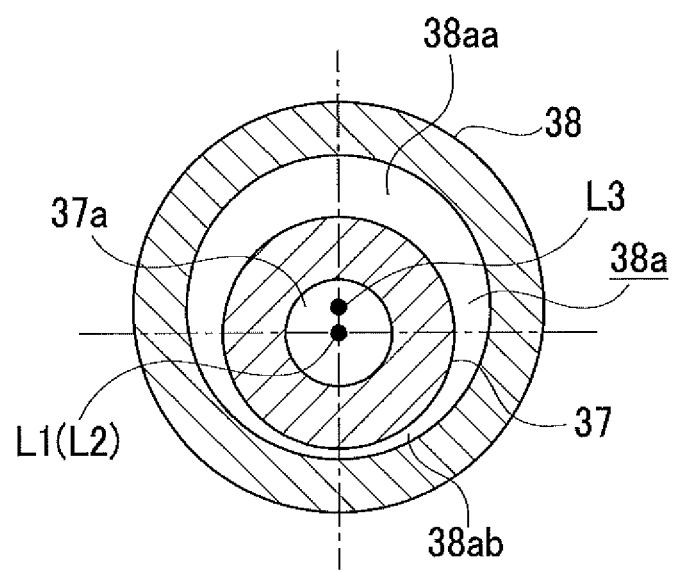
FIG. 3 is an enlarged sectional view of an inner nozzle and an outer nozzle taken along a line A-A in FIG. 2 in the first embodiment.

In the present embodiment, the two nozzles 37 and 38 include an inner nozzle 37 and an outer nozzle 38 provided to enclose the inner nozzle 37. The inner nozzle 37 and the outer nozzle 38 are placed to enclose a diffuser axis L1 as an axis of the diffuser 35. FIG. 3 is an enlarged sectional view of the inner nozzle 37 and the outer nozzle 38 taken along a line A-A in FIG. 2. As shown in FIG. 3, in the present embodiment, the inner nozzle 37 is placed such that an axis L2 of the inner nozzle 37 is aligned with the diffuser axis L1.

As shown in FIG. 2 and FIG. 3, the inner nozzle 37 is provided in its center with an inner injection hole 37a in which the hydrogen gas flows. There is provided between the inner nozzle 37 and the outer nozzle 38 an outer injection hole 38a having an annular sectional shape in which the hydrogen gas flows as similar to the inner injection hole 37a. Herein, when the main body casing 30 is placed horizontally so that the diffuser axis L1 is placed horizontal, as shown in FIG. 3, the outer injection hole 38a includes an upper hole portion 38aa located on an upper side of the diffuser axis L1 and a lower hole portion 38ab located on a lower side of the diffuser axis L1. Further, the inner nozzle 37 and the outer nozzle 38 are eccentrically placed to make the lower hole portion 38ab narrower than the upper hole portion 38aa. In the present embodiment, as shown in FIG. 3, the inner nozzle 37 is placed so that the axis L2 of the inner nozzle 37 is placed coaxial with the diffuser axis L1, and the outer nozzle 38 is placed so that an axis L3 of the outer nozzle 38 is upwardly deviated from the inner nozzle 37. Accordingly, the lower hole portion 38ab is made narrower than the upper hole portion 38aa. Further, in the present embodiment, the two first supply ports 31 and 32 are placed on an upper side of the main body casing 30 when the main body casing 30 is placed horizontally, and thus the hydrogen gas supplied to the respective first supply ports 31 and 32 flows vertically downward to the respective nozzles 37 and 38.

As shown in FIG. 2, in the main body casing 30, a gas passage 39 (as a fluid passage) including the diffuser 35 is provided between the negative pressure generation chamber 34 and the discharge port 33 to make the hydrogen gas and the hydrogen off-gas flow therein. In the vicinity of this gas passage 39, there is provided a warm water passage 40 (as one example of a warm fluid passage) to flow warm water (as warm fluid). Specifically, in the present embodiment, the main body casing 30 is configured with an outer casing 41 and an inner casing 42 assembled to an inside of the outer casing 41. The warm water passage 40 is provided around the gas passage 39 between the outer casing 41 and the inner casing 42.

Figure 4:
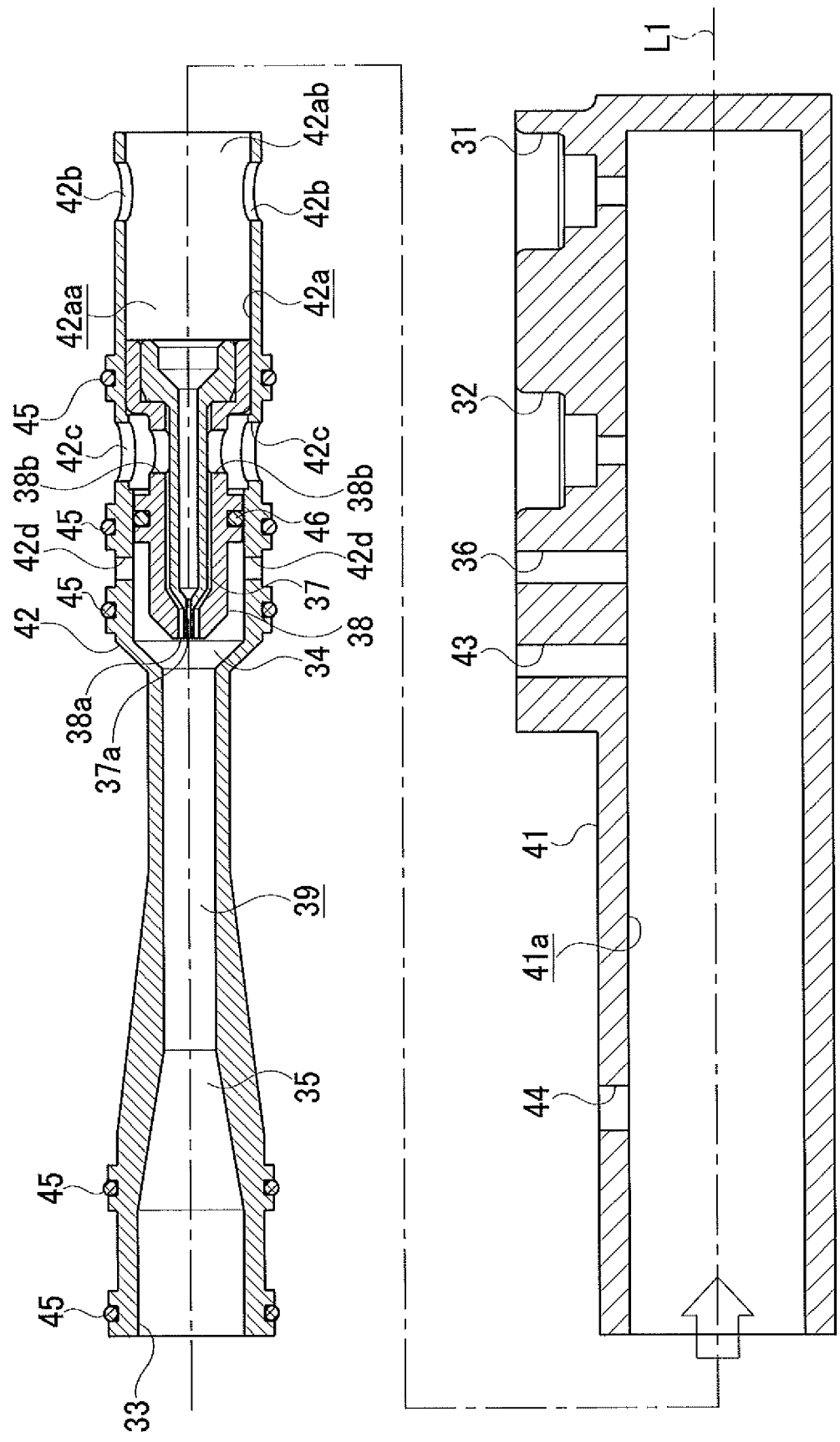
FIG. 4 is a front sectional exploded view of a main body casing in an outer casing and an inner casing in the first embodiment.

FIG. 4 shows an exploded front sectional view of the main body casing 30 disassembled to the outer casing 41 and the inner casing 42. As shown in FIG. 2 and FIG. 4, the outer casing 41 is provided with the first supply ports 31 and 32 and the second supply port 36. The inner casing 42 is provided with the inner nozzle 37, the outer nozzle 38, the negative pressure generation chamber 34, the gas passage 39 including the diffuser 35, and the discharge port 33. The warm water passage 40 has an annular cross section in a direction orthogonal to its longitudinal direction. The main body casing 30 is provided on its one end in the longitudinal direction of the warm water passage 40 with a warm water inlet 43 to introduce the warm water to the warm water passage 40 and on its the other end in the longitudinal direction of the warm water passage 40 with a warm water outlet 44 to bring out the warm water from the warm water passage 40. The main body casing 30 is configured such that the warm water introduced from the warm water inlet 43 spirally flows in the warm water passage 40 and is brought out of the warm water outlet 44. In the present embodiment, at least any one of an inner circumferential surface of the outer casing 41 and an outer circumferential surface of the inner casing 42 is formed with a spiral groove (not shown) in a range corresponding to the warm water passage 40 in order to flow the warm water in the warm water passage 40 in a spiral form. Herein, there are provided a plurality of annular-shaped sealing members 45 between the outer casing 41 and the inner casing 42 at spaced from one another along the diffuser axis L1. There is further provided a sealing member 46 between the inner casing 42 and the outer nozzle 38. Each of the sealing members 45 and 46 made of rubber is fitted in an annular groove formed on an outer periphery of the inner casing 42 and an outer periphery of the outer nozzle 38 to be assembled to the inner casing 42 and the outer nozzle 38. Herein, the spiral-shaped groove is formed in the present example, but the spiral groove is not necessarily formed.

As shown in FIG. 2 and FIG. 4, the outer casing 41 is of a bottomed cylindrical shape and has a hollow cavity 41a extending in a longitudinal direction with a uniform inner diameter. The outer casing 41 has a bottom on a side of the first end part 30a and an opening on a side of the second end part 30*b*. Further, on an upper side surface on the side of the first end part 30*a*, the first supply ports 31 and 32, the second supply port 36, and the warm water inlet 43 are formed to be communicated with the hollow cavity 41*a*. Furthermore, on an upper side surface on the side of the second end part 30*b* of the outer casing 41, the warm water outlet 44 communicated with the hollow cavity 41*a* is formed.

As shown in FIG. 2 and FIG. 4, the inner casing 42 of a bottomless cylindrical shape has a hollow cavity 42*a* partly having different inner diameter in its longitudinal direction. The inner casing 42 is provided on the side of the first end part 30*a* with a nozzle housing portion 42*aa* having a large diameter. This nozzle housing portion 42*aa* includes the negative pressure generation chamber 34 and accommodates the inner nozzle 37 and the outer nozzle 38. The hollow cavity 42*a* includes a space 42*ab* where the inner nozzle 37 and the outer nozzle 38 are not accommodated. A portion constituting the nozzle housing portion 42*aa* of the inner casing 42 is provided with communication holes 42*b*, 42*c*, and 42*d* at portions intersecting with axes of the first supply ports 31 and 32 and the second supply port 36, respectively. The respective nozzles 37 and 38 have hollow cavities extending in longitudinal directions at their center portions. The inner nozzle 37 is assembled with the hollow cavity of the outer nozzle 38. Under this assembled state, the outer nozzle 38 is provided on its outer periphery with a communication hole 38*b* in a portion intersecting with the axis of the first supply port 32. This communication hole 38*b* is positionally aligned with the communication hole 42*c* of the inner casing 42. Further, the inner casing 42 is formed with the gas passage 39 including the diffuser 35 and having the smaller inner diameter than the nozzle housing portion 42*aa* on the side of the second end part 30*b*.

In the present embodiment, the ejector 4 is manufactured in a manner that the sealing members 45, the inner nozzle 37, and the outer nozzle 38 (which has been assembled with the sealing member 46) are assembled to the inner casing 42 in advance, and the thus assembled inner casing 42 is arranged to be fitted in the hollow cavity 41*a* of the outer casing 41 as indicated with an arrow in FIG. 4.

(Operations and Effects of Ejector)

Figure 5:
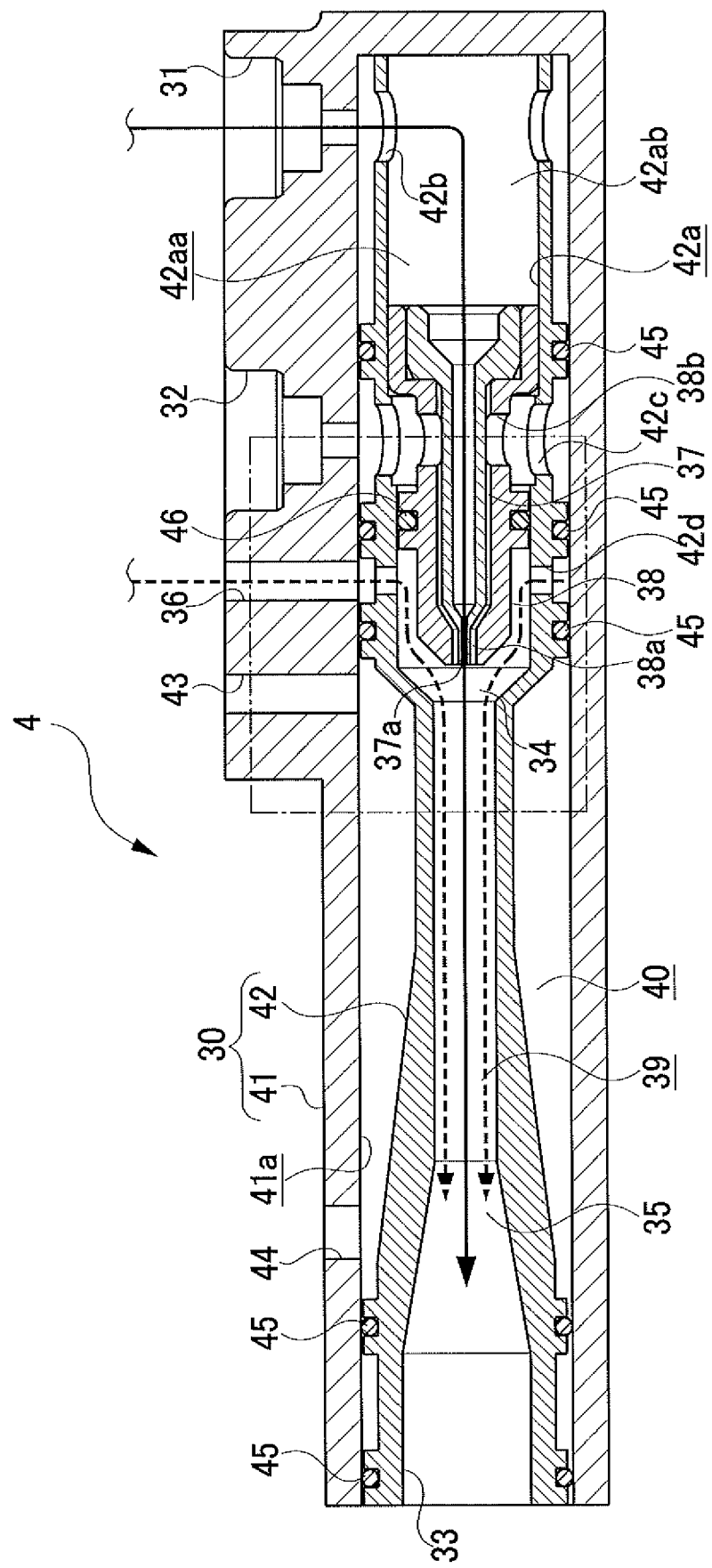
FIG. 5 is a front sectional view of the ejector indicating a flow of hydrogen gas supplied to one first supply port and a flow of hydrogen off-gas supplied to a second supply port in the first embodiment.
Figure 6:
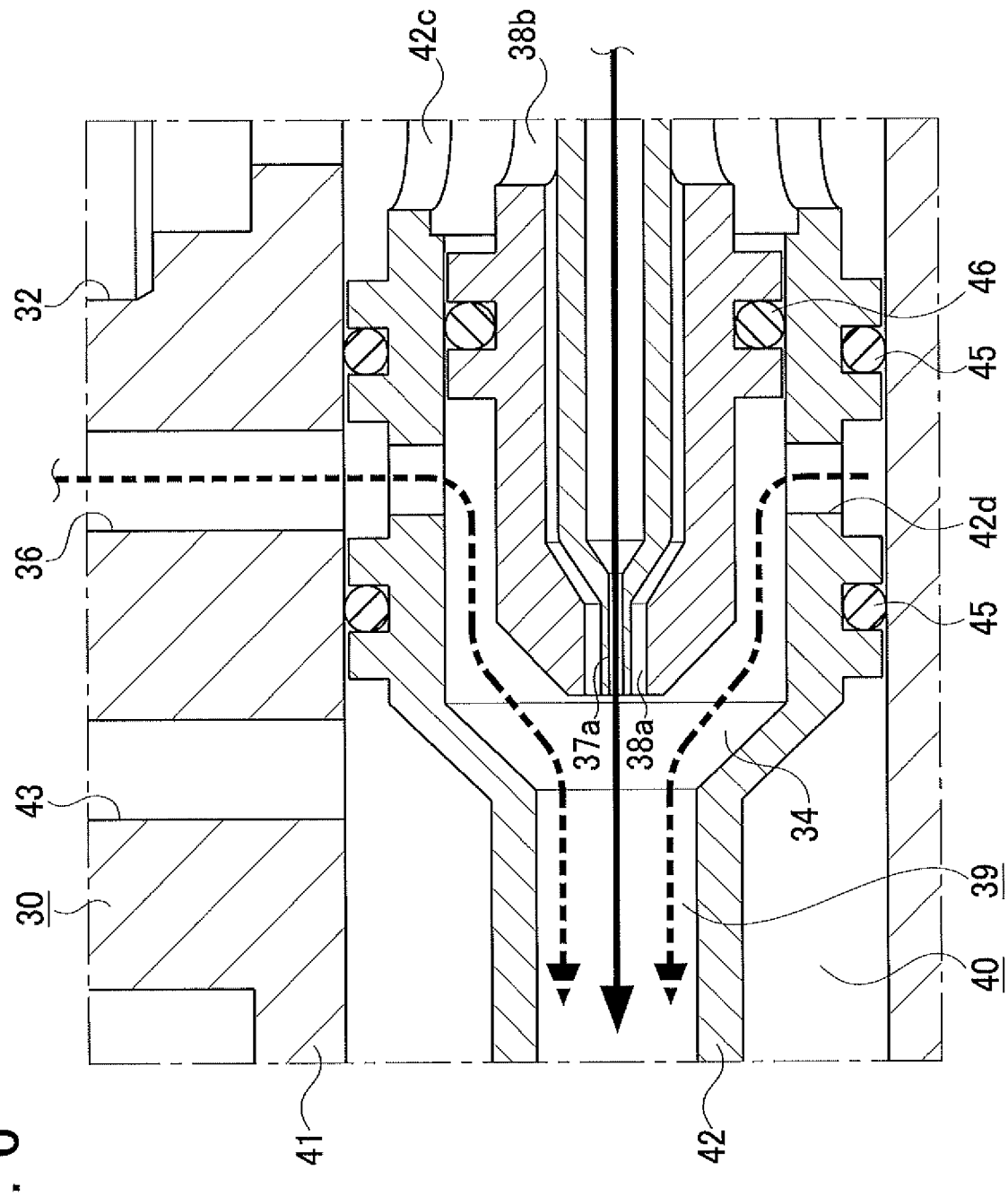
FIG. 6 is an enlarged sectional view of a part encircled by a chain double-dashed line in the ejector of FIG. 5 in the first embodiment.
Figure 7:
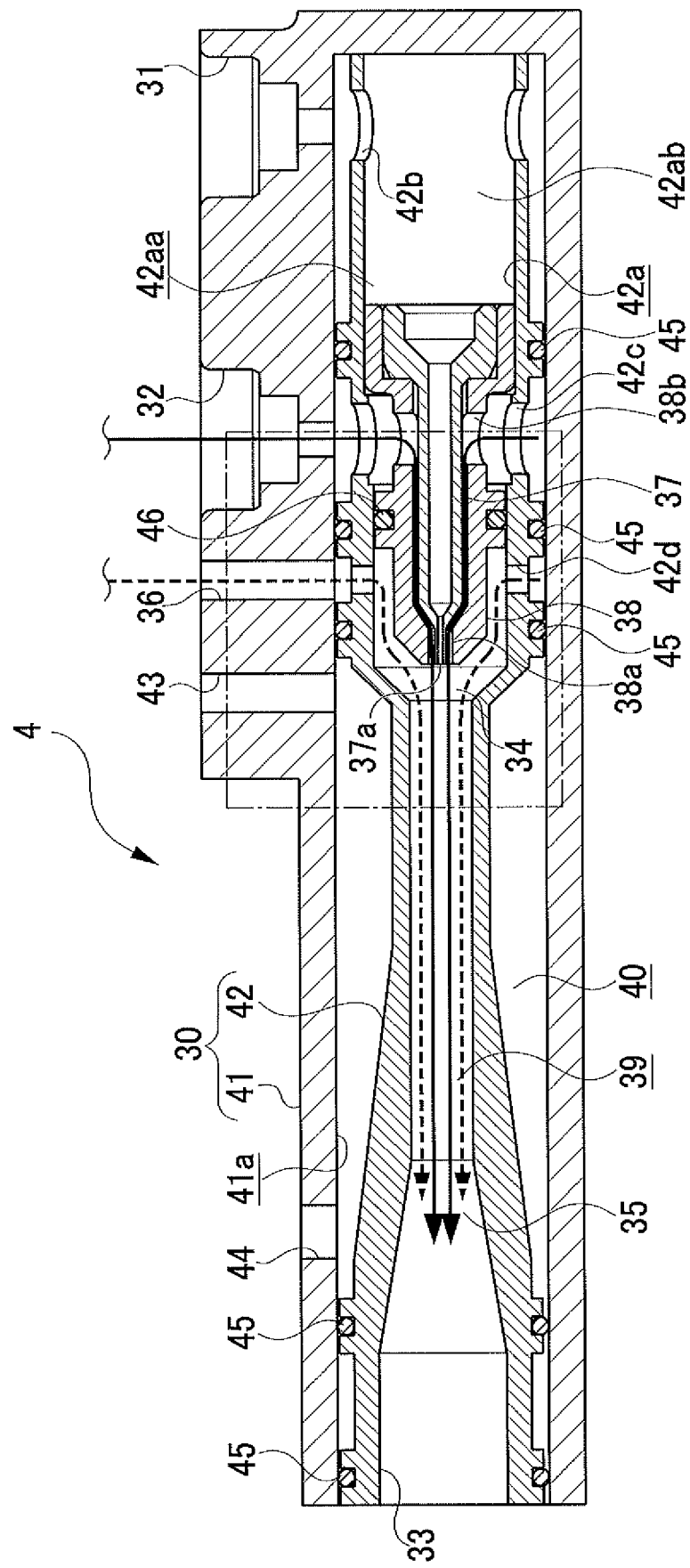
FIG. 7 is a front sectional view of the ejector indicating the flow of the hydrogen gas supplied to the other first supply port and the hydrogen off-gas supplied to the second supply port in the first embodiment.
Figure 8:
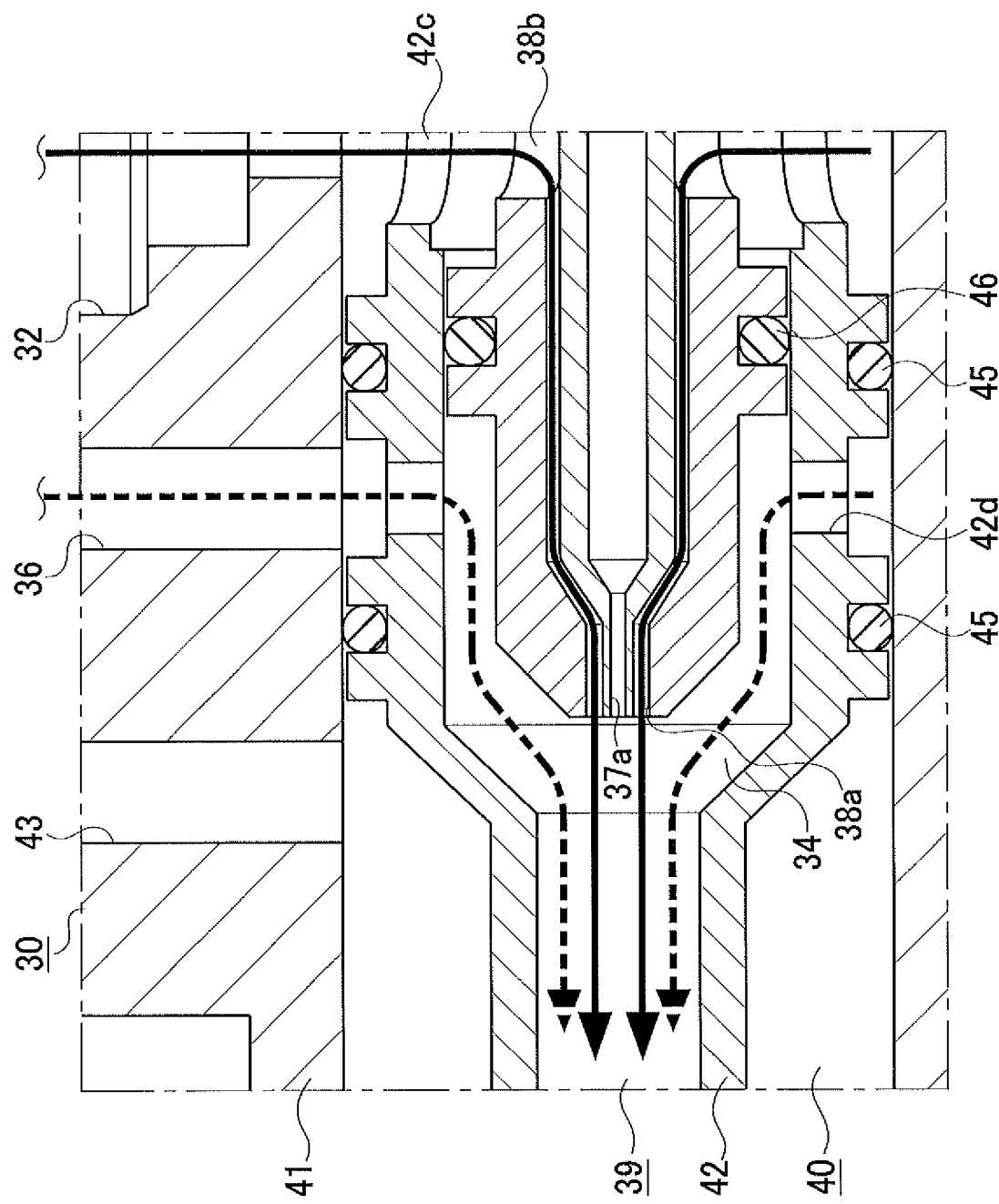
FIG. 8 is an enlarged sectional view showing a part encircled by a chain double-dashed line in the ejector of FIG. 7 in the first embodiment.

According to the configuration of the ejector 4 of the present embodiment explained above, the following operations and effects can be achieved. FIG. 5 is a front sectional view of the ejector 4, illustrating the flow of the hydrogen gas that is supplied to the one first supply port 31 (as indicated with a solid arrow) and the flow of the hydrogen off-gas that is supplied to the second supply port 36 (as indicated with a broken arrow). FIG. 6 is an enlarged sectional view of a part of the ejector 4 surrounded with a chain double-dashed line in FIG. 5. FIG. 7 is a front sectional view of the ejector 4, illustrating the flow of the hydrogen gas that is supplied to the other first supply port 32 (as indicated with the solid arrow) and the flow of the hydrogen off-gas that is supplied to the second supply port 36 (as indicated with the broken arrow). FIG. 8 is an enlarged sectional view of a part of the ejector 4 surrounded with a chain double-dashed line in FIG. 7.

As indicated with the solid (bold) arrows in FIG. 5 and FIG. 6, the hydrogen gas injected from the first injector 6A and supplied to the one first supply port 31 flows in the inner nozzle 37 and is injected to the negative pressure generation chamber 34 from the inner injection hole 37*a* and then flows in the gas passage 39 (the diffuser 35) to be discharged out of the discharge port 33. This flow of the hydrogen gas generates the negative pressure in the negative pressure generation chamber 34, and the hydrogen off-gas supplied to the second supply port 36 is sucked in the negative pressure generation chamber 34 by the thus generated negative pressure. The hydrogen off-gas flows in the gas passage 39 with the hydrogen gas and is mixed with the hydrogen gas and discharged out of the discharge port 33.

As indicated with the solid (bold) arrows in FIG. 7 and FIG. 8, the hydrogen gas injected from the second injector 6B to the other first supply port 32 flows in the outer nozzle 38 and is injected to the negative pressure generation chamber 34 from the outer injection hole 38*a* and then flows in the gas passage 39 (the diffuser 35) to be discharged out of the discharge port 33. This flow of the hydrogen gas generates the negative pressure in the negative pressure generation chamber 34, and the hydrogen off-gas supplied to the second supply port 36 is sucked in the negative pressure generation chamber 34 by the thus generated negative pressure. The hydrogen off-gas flows in the gas passage 39 with the hydrogen gas and is mixed with the hydrogen gas and discharged out of the discharge port 33.

Herein, the outer nozzle 38 is provided to enclose the inner nozzle 37, and the inner nozzle 37 and the outer nozzle 38 are placed to enclose the diffuser axis L1 of the main body casing 30, and thus the inner nozzle 37, the negative pressure generation chamber 34, and the diffuser 35 are placed about the diffuser axis L1. Accordingly, the hydrogen gas injected from the inner nozzle 37 or the outer nozzle 38 flows in the diffuser 35 as enclosing the diffuser axis L1, and the hydrogen off-gas sucked in the negative pressure generation chamber 34 is made to flow to the diffuser 35 as enclosing the thus flowing hydrogen gas. Therefore, the hydrogen gas injected from the inner nozzle 37 or the outer nozzle 38 to the negative pressure generation chamber 34 and the hydrogen off-gas sucked in the negative pressure generation chamber 34 can be preferably uniformly mixed. The inner nozzle 37 is formed with the inner injection hole 37*a* in which the hydrogen gas flows and there is provided between the inner nozzle 37 and the outer nozzle 38 the outer injection hole 38*a* having an annular section in which the hydrogen gas flows. Further, the outer injection hole 38*a* includes the upper-side hole portion 38*aa* and the lower-side hole portion 38*ab*, and the inner nozzle 37 and the outer nozzle 38 are placed eccentrically from each other so that the lower-side hole portion 38*ab* is made narrower than the upper-side hole portion 38*aa*. Accordingly, in the outer injection hole 38*a*, the flow of the hydrogen gas is relatively faster in the narrow lower-side hole portion 38*ab*, and the dew condensation water generated in the outer injection hole 38*a* is collected in the lower-side hole portion 38*ab* by its gravity and gets easy to be blown off to the negative pressure generation chamber 34 at high speed with the hydrogen gas. Owing to this configuration, the dew condensation water can be particularly effectively discharged out of the outer injection hole 38*a* of the outer nozzle 38, so that the disturbance in injection of the hydrogen gas due to the dew condensation water can be restrained.

According to the configuration of the present embodiment, the respective first supply ports 31 and 32 are placed on an upper side of the main body casing 30 when the main body casing 30 is placed horizontally. Accordingly, the hydrogen gas supplied to the respective first supply ports 31 and 32 flows vertically downward from the upper side of the main body casing 30 to the inner nozzle 37 and the outer nozzle 38. Therefore, especially the hydrogen gas flowing to the outer injection hole 38*a* of the outer nozzle 38 easily flows much to the lower-side hole portion 38*ab*, and as a result of this, the dew condensation water gathered in the lower-side hole portion 38*ab* gets easy to be blown off with the hydrogen gas to the negative pressure generation chamber 34 at high speed. Therefore, the dew condensation water can be further effectively discharged out of the outer injection hole 38a of the outer nozzle 38, and thus, the disturbance in the injection of the hydrogen gas due to the dew condensation water can be assuredly restrained.

Figure 9:
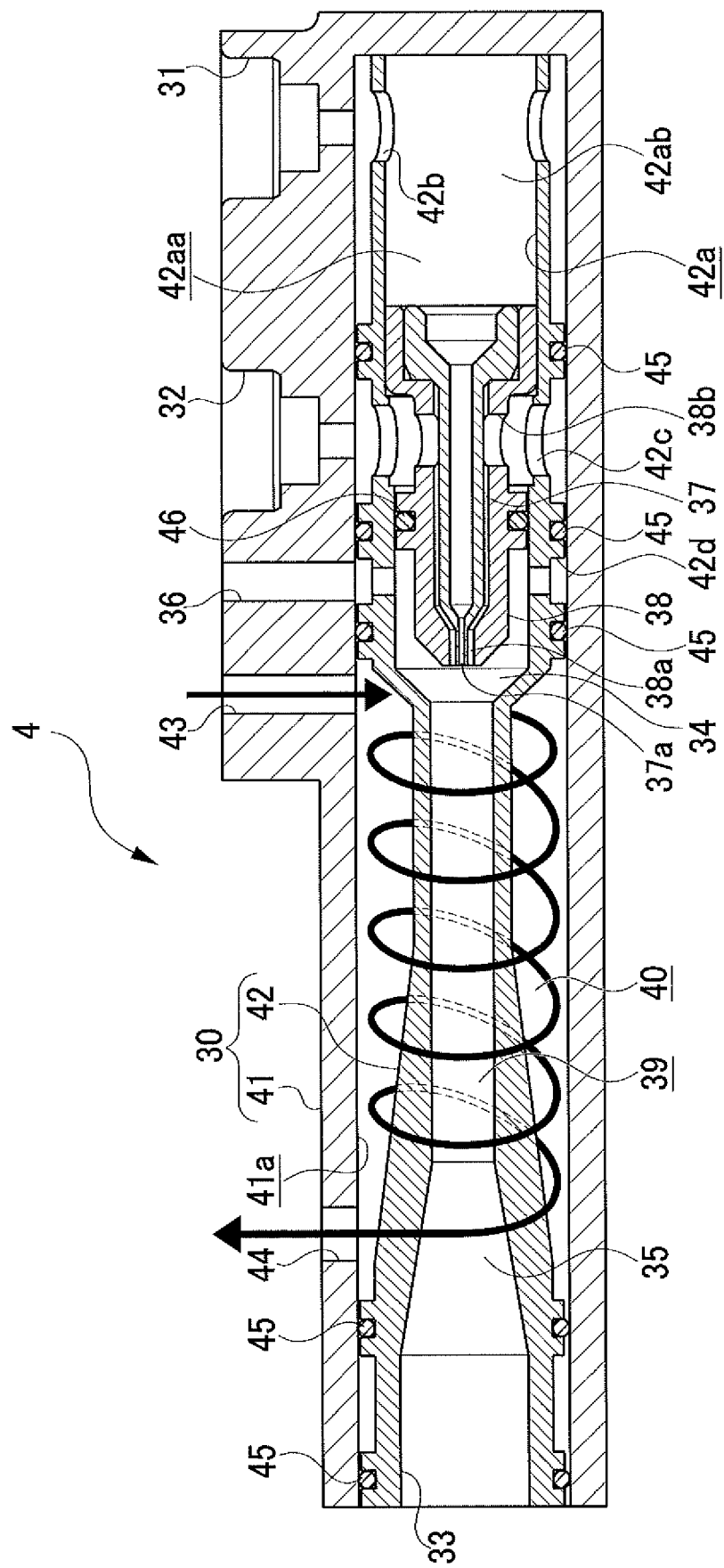
FIG. 9 is a front sectional view of the ejector indicating a flow (indicated with a bold arrow) of warm water introduced in a warm water inlet in the first embodiment.

FIG. 9 is a front sectional view of the ejector 4, illustrating the flow (indicated with a bold arrow) of the warm water introduced in the warm water inlet 43. As shown in FIG. 9, according to the configuration of the present embodiment, the warm water introduced from the warm water inlet 43 flows spirally in the warm water passage 40 around the gas passage 39 and is then brought out of the warm water outlet 44. Accordingly, the flow of the warm water in the warm water passage 40 warms up the gas passage 39, and thus a temperature of an inner wall of the gas passage 39 hardly decreases to a dew point temperature. Therefore, it is possible to restrain generation of the dew condensation water and freezing of the dew condensation water in the gas passage 39. This results in prevention of unnecessary dew condensation water from flowing in the fuel cell 1 from the ejector 4.

According to the configuration of the present embodiment, the inner casing 42 is assembled to an inside of the outer casing 41 to configure the main body casing 30. Concurrently with this assembling, the warm water passage 40 is provided around the gas passage 39 between the outer casing 41 and the inner casing 42. Therefore, the warm water passage 40 can be relatively easily formed in the ejector 4.

Second Embodiment

Next, a second embodiment embodying an ejector and a fuel cell system including the same is explained in detail with reference to the accompanying drawings.

Herein, in the following explanation, similar components with the first embodiment will be indicated with the same referential signs with the first embodiment and explanation thereof is omitted. The following explanation is thus made with focus on the differences from the first embodiment.

Figure 10:
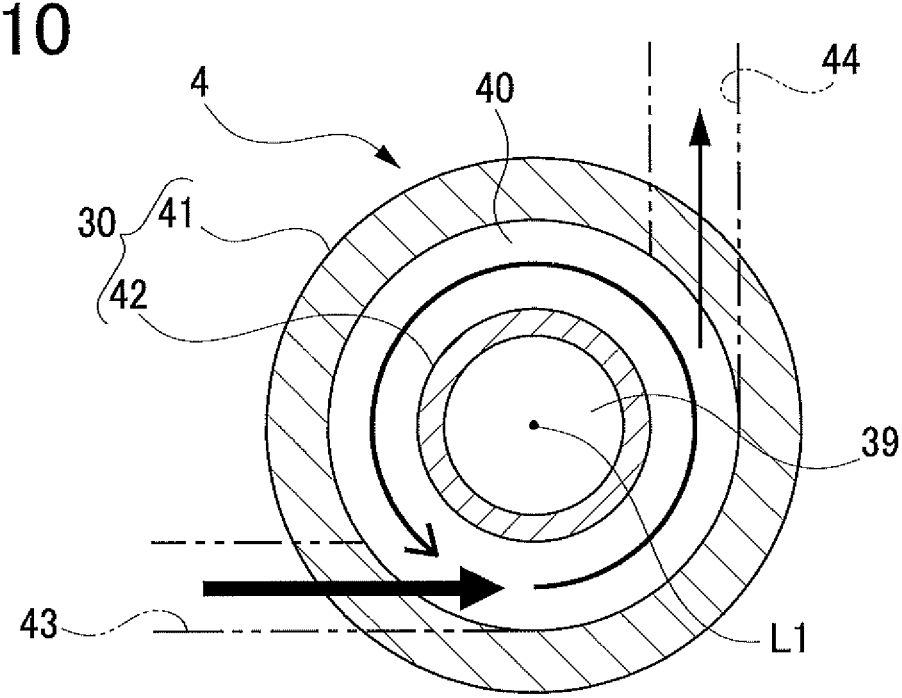
FIG. 10 is a sectional view of the ejector taken along a plane surface orthogonal to a diffuser axis in a midway of a gas passage and a warm water passage in a second embodiment.
Figure 11:
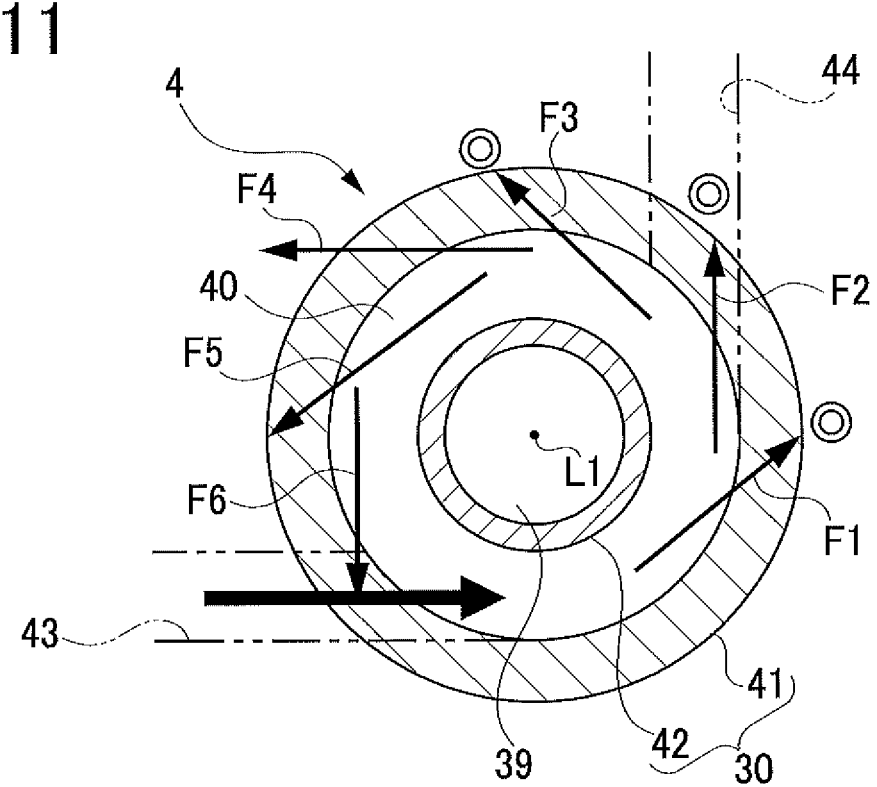
FIG. 11 is a sectional view of the ejector taken along a plane surface orthogonal to the diffuser axis in the midway of the gas passage and the warm water passage in the second embodiment.

The present embodiment is different from the first embodiment in the configuration of the warm water inlet 43 and the warm water outlet 44 of the warm water passage 40 in the ejector 4. FIG. 10 and FIG. 11 each show a sectional view of the ejector 4 taken along a plane surface perpendicular to the diffuser axis L1 in the midway of the gas passage 39 and the warm water passage 40. In FIG. 10, the flow of the warm water in the warm water passage 40 is indicated with an arrow. In FIG. 11, orientations of tangential directions with respect to the annular flow of the warm water in the warm water passage 40 are indicated with arrows. As shown in FIG. 10, in the present embodiment, the warm water inlet 43 of the warm water is formed to extend in the horizontal direction on a lower side of the outer casing 41, and the warm water outlet 44 of the warm water is formed to extend in the vertical direction on an upper side of the outer casing 41.

Specifically in the present embodiment, as shown in FIG. 11, the warm water inlet 43 and the warm water outlet 44 are arranged to face the tangential directions of the annular section of the warm water passage 40, respectively. Further, among the warm water inlet 43 and the warm water outlet 44, the warm water outlet 44 is provided so as to open upward. As shown in FIG. 11, the tangential directions of the annular section of the warm water passage 40 can be indicated with arrows F1 to F6. Among these tangential directions, for example, the warm water outlet 44 opens upward when the arrows F1 to F3 indicated each with a double circle are applicable. In the present embodiment, among the arrows F1 to F3, the warm water outlet 44 is provided to open vertically upward in a position of the arrow F2. The position of providing the warm water outlet 44 is however not limited to the positions of the arrows F1 to F3 as long as the warm water outlet 44 faces on an upper side upper than the diffuser axis L1.

(Operations and Effects of Ejector)

According to the configuration of the ejector 4 of the present embodiment, the following operations and effects can be achieved in addition to the operations and effects of the first embodiment. To be specific, the warm water passage 40 has the annular section, and the main body casing 30 is provided on one end side in its longitudinal direction with the warm water inlet 43 in which the warm water is introduced and on the other end side in the longitudinal direction with the warm water outlet 44 from which the warm water is brought out. Further, the warm water introduced in the warm water inlet 43 spirally flows through the warm water passage 40 and is brought out of the warm water outlet 44. Accordingly, the entire gas passage 39 extending along the diffuser axis L1 of the main body casing 30 is uniformly warmed up by the warm water spirally flowing around the passage 39. Further, the warm water inlet 43 and the warm water outlet 44 are arranged to face the tangential directions of the annular section of the warm water passage 40, respectively. Accordingly, the warm water is easily introduced from the warm water inlet 43 to the warm water passage 40 and is easily brought out of the warm water passage 40 to the warm water outlet 44. This facilitates increase in the flow velocity of the warm water in the warm water passage 40, thereby improving the effect of warming up the gas passage 39 by the warm water. Furthermore, at least any one of the warm water inlet 43 and the warm water outlet 44 opens upward, and thus the air having entered in the warm water passage 40 is easily released outside from at least any one of the warm water inlet 43 and the warm water outlet 44. Therefore, the air hardly resides in the warm water passage 40, so that the effect of warming up the gas passage 39 by the warm water is ensured in that sense.

Third Embodiment

A third embodiment embodying the ejector and the fuel cell system including the same is now explained in detail with reference to the accompanying drawings.

Figure 12:
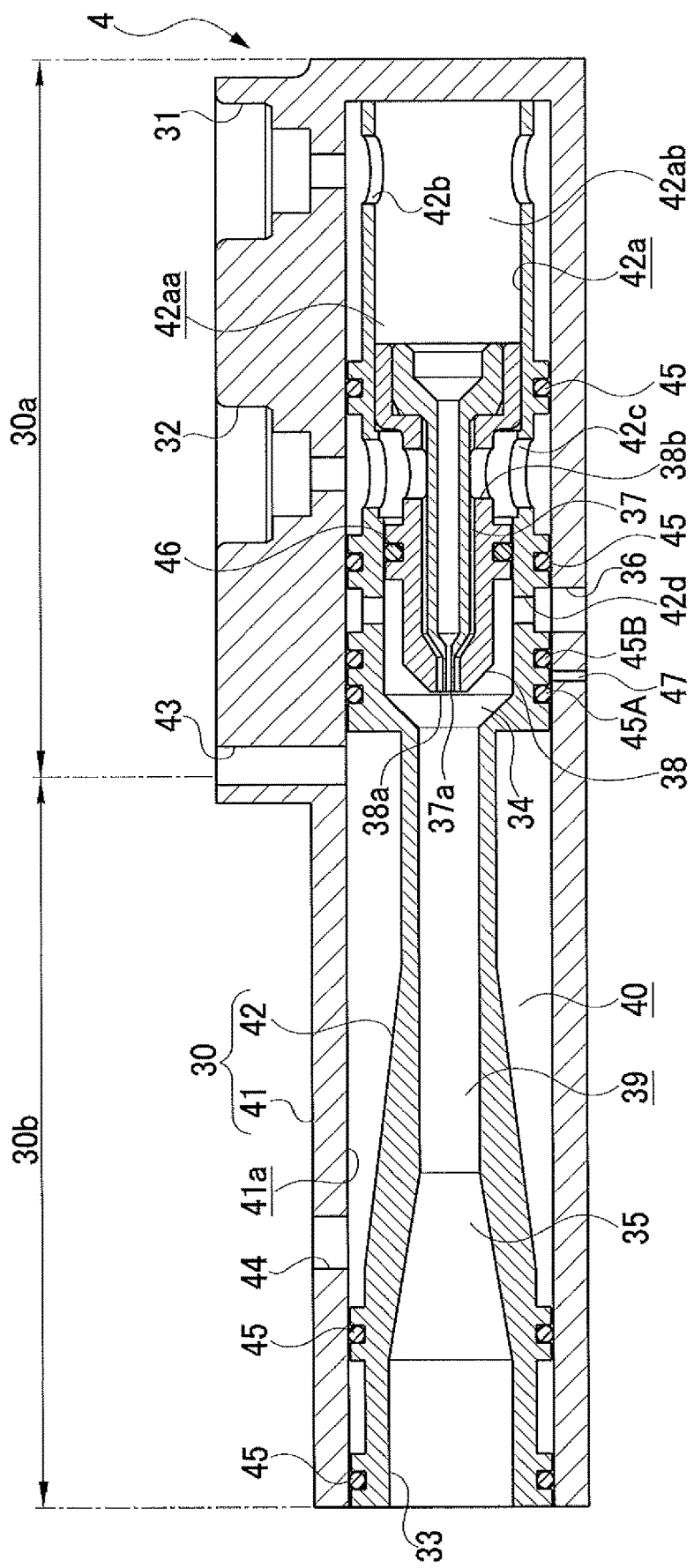
FIG. 12 is a front sectional view of the ejector corresponding to FIG. 2 in a third embodiment.

The present embodiment differs from the first embodiment in the configuration of the ejector 4. FIG. 12 is a front sectional view of the ejector 4 corresponding to FIG. 2. In the present embodiment, the configuration of the sealing member 45 and arrangement and others of the second supply port 36 are different from those of the first embodiment. As shown in FIG. 12, in the present embodiment, the second supply port 36 for the hydrogen off-gas is placed in a vertically lower side of the outer casing 41. Further, there are provided two sealing members 45A and 45B adjacent to each other with a gap between the outer casing 41 and the inner casing 42 and also between the second supply port 36 and the warm water passage 40. The outer casing 41 is further provided in a position corresponding to the gap between the two sealing members 45A and 45B with an exhaust port 47 to discharge the moisture or the hydrogen off-gas outside.

(Arrangement of Ejector and Others in Fuel Cell System)

Figure 13:
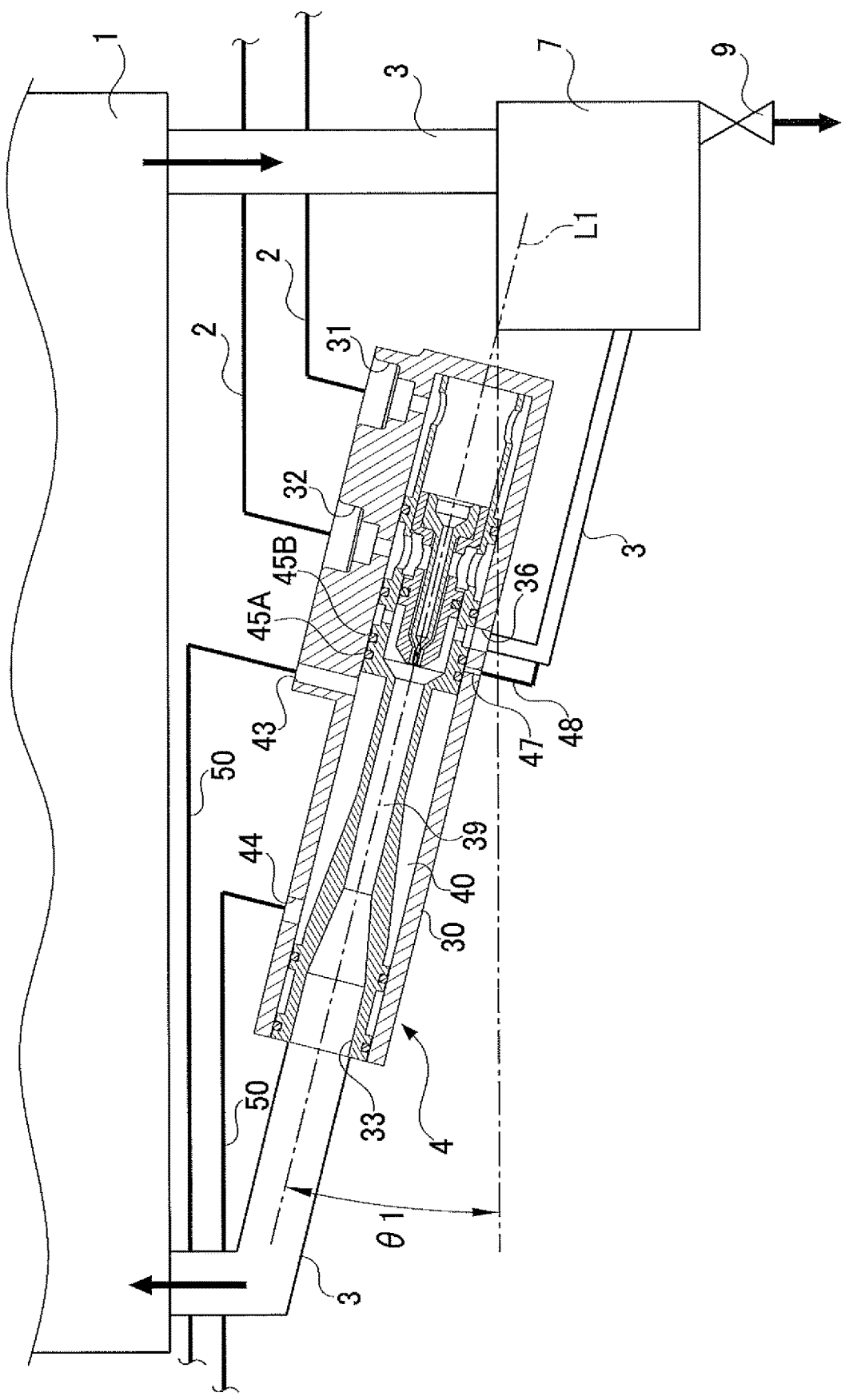
FIG. 13 is a schematic view illustrating a positional relation of the fuel cell, the ejector, and a gas-liquid separator in the fuel cell system in the third embodiment.

Next, arrangement of the ejector 4 and others in the fuel cell system is explained in detail. FIG. 13 is a schematic view illustrating an arrangement relation of the fuel cell 1, the ejector 4, and the gas-liquid separator 7 in the fuel cell system. As shown in FIG. 13, the ejector 4 is disposed on a vertically lower side of the fuel cell 1 and on a vertically upper side of the gas-liquid separator 7. The ejector 4 is arranged with an inclination of a predetermined angle θ1 with respect to the horizontal direction so that the first end part 30a including the first supply ports 31 and 32 and the second supply port 36 of the ejector 4 is disposed on the vertically lower side of the second end part 30b including the discharge port 33. Further, the hydrogen circulation passage 3 extending from the gas-liquid separator 7 is connected to the second supply port 36 which opens downward from the vertically lower side of the ejector 4. The hydrogen circulation passage 3 between the gas-liquid separator 7 and the ejector 4 is also slanted downwardly from the ejector 4 toward the gas-liquid separator 7. Further, the exhaust port 47 provided on a lower side of the ejector 4 is connected with a drain passage 48 extending downward. A lower end of the drain passage 48 is connected to the hydrogen circulation passage 3 between the gas-liquid separator 7 and the ejector 4. Furthermore, the warm water inlet 43 and the warm water outlet 44 which are provided in the ejector 4 are connected with a warm water circulation passage 50 to circulate the warm water.

(Operations and Effects of Ejector)

According to the configuration of the ejector 4 of the present embodiment, the following operations and effects can be achieved in addition to those of the first embodiment. Specifically, the two sealing members 45A and 45B are provided to be adjacent to each other with a gap between the outer casing 41 and the inner casing 42 and also between the second supply port 36 and the warm water passage 40. Further, the outer casing 41 is provided with the exhaust port 47 corresponding to the gap between the two sealing members 45A and 45B. Therefore, even if the hydrogen off-gas leaks out of the second supply port 36 to the warm water passage 40 through the sealing member 45B or even if the warm water leaks out of the warm water passage 40 to the second supply port 36 through the sealing member 45A, the hydrogen off-gas or the warm water is made to be discharged outside through the exhaust port 47. Therefore, it can be prevented that the warm water flowing in the warm water passage 40 is mixed with the hydrogen off-gas and that the hydrogen off-gas flowing in the second supply port 36 is mixed with the warm water.

(Operations and Effects of Fuel Cell System)

According to the configuration of the fuel cell system of the present embodiment, in the fuel cell system, the ejector 4 is disposed on the vertically lower side of the fuel cell 1 and on the vertically upper side of the gas-liquid separator 7. Then, the ejector 4 is inclined so that the first end part 30a including the respective first supply ports 31 and 32 and the second supply port 36 is disposed on the vertically lower side lower than the second end part 30b including the discharge port 33. Further, the second supply port 36 is disposed on the vertically lower side of the ejector 4, and the hydrogen gas circulation passage 3 extending from the gas-liquid separator 7 is connected to the second supply port 36 from the vertically lower side of the ejector 4. Accordingly, even if the dew condensation water generated in the fuel cell 1 flows in the ejector 4 through the hydrogen supply passage 2 and even if the dew condensation water is generated in the ejector 4, the thus generated dew condensation water flows from the negative pressure generation chamber 34 to the second supply port 36 owing to the inclination of the ejector 4 and further flows in the gas-liquid separator 7 through the hydrogen circulation passage 3. Therefore, the dew condensation water generated in the fuel cell 1 and the ejector 4 can be discharged to the gas-liquid separator 7 and separated in the gas-liquid separator 7.

Further, according to the configuration of the present embodiment, the lower end of the drain passage 48 connected to the exhaust port 47 to extend downward is connected to the hydrogen circulation passage 3 between the gas-liquid separator 7 and the ejector 4. Therefore, the hydrogen off-gas or the warm water flowing from the exhaust port 47 to the drain passage 48 can be separated in the gas-liquid separator 7.

Fourth Embodiment

Next, a fourth embodiment embodying the ejector and the fuel cell system including the same is explained in detail with reference to the accompanying drawings.

In the respective above embodiments, the main body casing 30 of the ejector 4 is configured with the outer casing 41 and the inner casing 42 and is provided between the casings 41 and 42 with the warm water passage 40. Alternatively, as shown in a sectional view of FIG. 14 corresponding to FIG. 2, the warm water passage may be omitted so that the main body casing 30 of the ejector 4 is configured as a single configuration. In this case, no effect of warming by the warm water can be expected, but the operations and effects as similar to the first embodiment can be achieved and also the configuration of the ejector 4 can be simplified.

Figure 14:
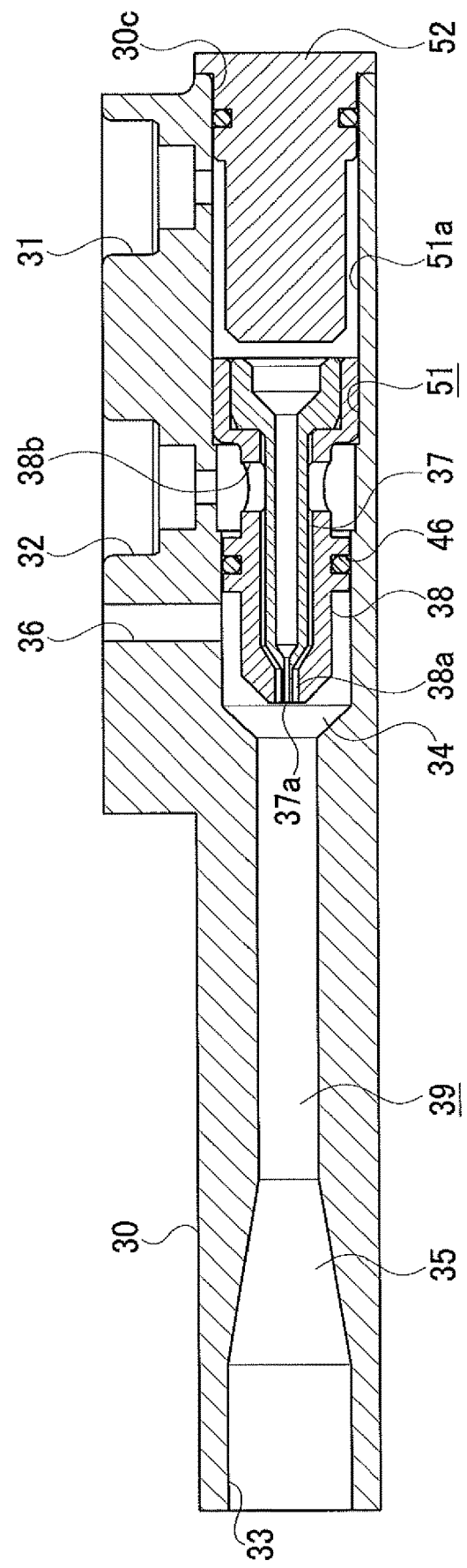
FIG. 14 is a front sectional view of the ejector corresponding to FIG. 2 in the fourth embodiment.

As shown in FIG. 14, in the present embodiment, the main body casing 30 of a bottomless cylindrical shape includes a hollow cavity 51 having a large inner diameter on one end side in the longitudinal direction. In an almost half part of the cavity 51, the negative pressure generation chamber 34 is provided and the inner nozzle 37 and the outer nozzle 38 are accommodated. Further, the remaining almost half part of the cavity 51 has a space 51a in which the inner nozzle 37 and the outer nozzle 38 are not accommodated. This space 51a has an inner diameter large enough to be inserted with the respective nozzles 37 and 38. With the space 51a, the first supply port 31 is communicated. The space 51a is positioned between the first supply port 31 and the respective nozzles 37 and 38, and thus in this state, the hydrogen gas supplied to the first supply port 31 could be decompressed in this space 51a. To address this, a plug 52 is fitted in the space 51a in order to decrease a volume of the space 51a and to close a one end opening 30c of the main body casing 30.

According to the configuration of the present embodiment, the plug 52 is fitted in the space 51a in which the nozzles 37 and 38 are not accommodated, and thus the volume of the space 51a is decreased. Accordingly, decompression of the hydrogen gas that has been introduced from the first supply port 31 to the space 51a is prevented. This achieves supply of the hydrogen gas that has been restrained from decompression to the inner nozzle 37, so that the flow velocity of the hydrogen gas in the inner injection hole 37a of the inner nozzle 37 is increased, thereby further improving the effect of discharging the dew condensation water in the inner injection hole 37a.

The present disclosure is not limited to the above respective embodiments and may be embodied with partly changing its configuration in an appropriate manner without departing from the scope of the disclosure.

(1) In the above-mentioned fourth embodiment, the main body casing 30 of the ejector 4 is configured as a single configuration with the warm water passage omitted, and configured such that the space 51a in which the nozzles 37 and 38 are not accommodated is fitted with the plug 52 to reduce the volume of the space 51a. As an alternative, also in the first to third embodiments configured with the main body casing 30 of a dual casing structure of the outer casing 41 and the inner casing 42, the space 42ab (see FIG. 2 and others), in which the respective nozzles 37 and 38 of the inner casing 42 are not accommodated, may be fitted with a protrusion 53 (indicated with a double chain line in FIG. 2) and a plug (not shown) provided in the outer casing 41, so that the volume of the space can be reduced.

Figure 15:
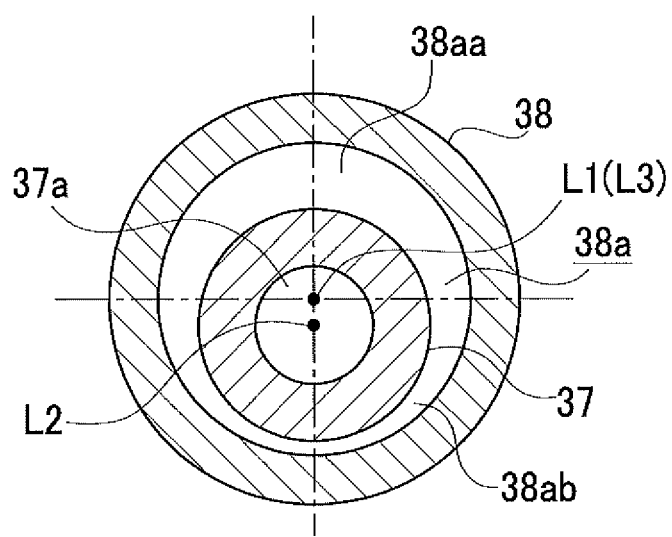
FIG. 15 is a sectional view of the inner nozzle and the outer nozzle corresponding to FIG. 3 in another embodiment.

(2) In the above-mentioned respective embodiments, as shown in FIG. 3, the inner nozzle 37 and the diffuser 35 are placed about the diffuser axis L1, and the inner nozzle 37 and the outer nozzle 38 are placed eccentrically from each other so that the lower hole portion 38ab of the outer injection hole 38a is narrower than the upper hole portion 38aa. As an alternative to this, as shown in a sectional view of FIG. 15 corresponding to FIG. 3, the outer nozzle 38 and the diffuser 35 may be placed about the diffuser axis L1, and the inner nozzle 37 and the outer nozzle 38 may be placed eccentrically from each other so that the lower hole portion 38ab of the outer injection hole 38a is narrower than the upper hole portion 38aa.

(3) In the above-mentioned respective embodiments, the inner nozzle 37 and the outer nozzle 38 are provided as a plurality of nozzles. Alternatively, another nozzle may further be provided to enclose the inner nozzle and the outer nozzle.

(4) In the above-mentioned first to third embodiments, the warm water is made to flow in the warm water passage 40 as a warm fluid passage, but alternatively, other than the warm water, the configuration may include a warm air passage to flow compressed warm air flowing from the air pump 13 to the fuel cell 1. Further, as examples of warm fluid flowing in the warm fluid passage, heated liquid or gas, warmed liquid or gas, or liquid or gas which has been kept warm may be adopted.

INDUSTRIAL APPLICABILITY

The present disclosure may be applied to a fuel cell system mounted on a vehicle such as a hydrogen automobile, for example.

REFERENCE SIGNS LIST

1 Fuel cell
2 Hydrogen supply passage (Fuel supply passage)
3 Hydrogen circulation passage (Fuel circulation passage)
7 Gas-liquid separator
30 Main body casing
30a First end part
30b Second end part
31 First supply port
32 First supply port
33 Discharge port
34 Negative pressure generation chamber
35 Diffuser
36 Second supply port
37 Inner nozzle
37a Inner injection hole
38 Outer nozzle
38a Outer injection hole
38aa Upper hole portion
38ab Lower hole portion
39 Gas passage (Fluid passage)
40 Warm water passage (Warm fluid passage)
41 Outer casing
42 Inner casing
42a Cavity
42ab Space
43 Warm water inlet (Warm fluid inlet)
44 Warm water outlet (Warm fluid outlet)
45A Sealing member
45B Sealing member
47 Exhaust port
51 Cavity
51a Space
52 Plug
L1 Diffuser axis
L2 Axis of the inner nozzle

The invention claimed is:

1. An ejector comprising a tubular main body casing, the main body casing including:
a plurality of first supply ports configured to receive supply of a working fluid;
a second supply port configured to receive supply of a target fluid;
a negative pressure generation chamber configured to generate a negative pressure by the working fluid;
a plurality of nozzles respectively provided corresponding to a plurality of the first supply ports and each having a leading end placed in the negative pressure generation chamber to inject the working fluid;
a diffuser in which the working fluid and the target fluid flow, which is communicated with the negative pressure generation chamber; and
a discharge port to discharge the working fluid and the target fluid that have flown in the diffuser to outside,
the ejector being configured such that the negative pressure is generated in the negative pressure generation chamber by the working fluid that is supplied to the respective first supply ports and injected from the respective corresponding nozzles, the target fluid is sucked in the negative pressure generation chamber from the second supply port by the negative pressure, and the target fluid is made to flow with the working fluid to the diffuser to be discharged out of the discharge port, wherein
a plurality of the nozzles include an inner nozzle and at least one outer nozzle provided to enclose the inner nozzle, the inner nozzle and the outer nozzle being arranged to enclose a diffuser axis as an axis of the diffuser so that any one of an axis of the inner nozzle and an axis of the outer nozzle is arranged to be aligned with the diffuser axis,
the inner nozzle is provided with an inner injection hole in which the working fluid flows, an outer injection hole having an annular section in which the working fluid flows is provided between the inner nozzle and the outer nozzle, when the main body casing is horizontally placed so that the diffuser axis extends horizontally, and the outer injection hole including an upper hole portion on an upper side of the diffuser axis and a lower hole portion on a lower side of the diffuser axis is placed such that the inner nozzle and the outer nozzle are eccentrically placed from each other to make the lower hole portion narrower than the upper hole portion.

2. The ejector according to claim 1, wherein the respective first supply ports are placed on an upper side of the main body casing when the main body casing is horizontally placed.

3. The ejector according to claim 1, wherein
the main body casing is provided between the negative pressure generation chamber and the discharge port with a fluid passage in which the working fluid and the target fluid flow, the main body casing including the diffuser, and
a warm fluid passage to flow a predetermined warm fluid therein is provided in a surrounding of the fluid passage.

4. The ejector according to claim 3, wherein
the warm fluid passage has an annular section in a direction orthogonal to its longitudinal direction,
the main body casing is provided with a warm fluid inlet on one end in the longitudinal direction of the warm fluid passage to introduce the warm fluid in the warm fluid passage and a warm fluid outlet on the other end in the longitudinal direction of the warm fluid passage to bring the warm fluid out of the warm fluid passage, the main body casing being configured such that the warm fluid introduced from the warm fluid inlet flows spirally in the warm fluid passage to be brought out of the warm fluid outlet, and
the warm fluid inlet and the warm fluid outlet are placed to face in tangential directions of the annular section of the warm fluid passage so that at least any one of the warm fluid inlet and the warm fluid outlet opens upward.

5. The ejector according to claim 3, wherein
the main body casing is configured with an outer casing and an inner casing attached to an inside of the outer casing,
the outer casing is provided with the respective first supply ports and the second supply port, and the inner casing is provided with the inner nozzle, the outer nozzle, the negative pressure generation chamber, the fluid passage, and the discharge port,
a warm fluid passage to flow the predetermined warm fluid is provided around the fluid passage between the outer casing and the inner casing,
a plurality of sealing members are provided adjacent to one another with a gap between the outer casing and the inner casing and between the second supply port and the warm fluid passage, and
the outer casing is provided with an exhaust port in correspondence with the gap between a plurality of the sealing members to eject the fluid outside.

6. The ejector according to claim 1, wherein
the main body casing is provided on its one end portion in a longitudinal direction with the negative pressure generation chamber and with a cavity in which the inner nozzle and the outer nozzle are accommodated,
the cavity has a space in which the inner nozzle and the outer nozzle are not accommodated, and the space is communicated with the first supply port and embedded with a plug or a protrusion to reduce a volume of the space.

7. A fuel cell system provided with the ejector according to claim 1, comprising:
a fuel cell to generate electricity by receiving supply of fuel gas and oxidant gas;
a fuel supply passage to supply the fuel gas to the fuel cell;
a fuel circulation passage to circulate fuel off-gas discharged from the fuel cell to the fuel supply passage; and
the ejector provided in a connected portion of the fuel supply passage and the fuel circulation passage.

8. The fuel cell system according to claim 7, wherein
the fuel cell system includes a gas-liquid separator in the fuel circulation passage upstream of the ejector to separate gas and liquid,
the ejector is placed on a vertically lower side of the fuel cell and on a vertically upper side of the gas-liquid separator,
the ejector is arranged to be inclined such that a side on which the respective first supply ports and the second supply port are provided is placed on a vertically lower side than a side on which the discharge port of the ejector is provided,
the second supply port is placed on the vertically lower side of the ejector, and
the fuel circulation passage extending from the gas-liquid separator is connected to the second supply port from the vertically lower side of the ejector.

9. The ejector according to claim 2, wherein
the main body casing is provided between the negative pressure generation chamber and the discharge port with a fluid passage in which the working fluid and the target fluid flow, the main body casing including the diffuser, and
a warm fluid passage to flow a predetermined warm fluid therein is provided in a surrounding of the fluid passage.

* * * * *